United States Patent [19]
Papadopoulos et al.

[11] Patent Number: 5,602,836
[45] Date of Patent: Feb. 11, 1997

[54] MULTIPLE ACCESS CELLULAR COMMUNICATION WITH CIRCULAR INTERLEAVING AND REDUCED DROPPED-PACKET RUNLENGTHS

[75] Inventors: Haralabos C. Papadopoulos, Cambridge, Mass.; Carl-Erik W. Sundberg, Chatham, N.J.

[73] Assignee: Lucent Technologies Inc., Murray Hill, N.J.

[21] Appl. No.: 364,367

[22] Filed: Dec. 27, 1994

Related U.S. Application Data

[63] Continuation-in-part of Ser. No. 157,778, Nov. 24, 1993, Pat. No. 5,420,851.

[51] Int. Cl.[6] .......................................................... H04J 3/17
[52] U.S. Cl. .............................................. 370/280; 370/337
[58] Field of Search ................................. 370/17, 24, 29, 370/30, 50, 61, 69–71, 79, 80, 81, 85–86, 95.1, 95.3; 379/59, 60; 455/33.1, 33.4, 56.1

[56] References Cited

U.S. PATENT DOCUMENTS

| | | |
|---|---|---|
| 4,841,521 | 6/1989 | Amada et al. . |
| 4,949,335 | 8/1990 | Moore . |
| 4,949,395 | 8/1990 | Rydbeck ............................. 370/80 X |
| 4,979,170 | 12/1990 | Gilhousen et al. . |
| 4,987,571 | 1/1991 | Haymond et al. . |
| 5,025,442 | 6/1991 | Lynk et al. . |
| 5,117,423 | 5/1992 | Shepherd et al. . |
| 5,200,956 | 4/1993 | Pudney et al. . |
| 5,327,429 | 7/1994 | Partois et al. ...................... 370/95.1 X |

OTHER PUBLICATIONS

Amitay, N., and Nanda, S., "Resource Auction Multiple Access (RAMA) for Statistical Multiplexing of Speech in Wireless PCS," in ICC'93, Conf. Rec., (Geneva, Switzerland), May 1993, pp. 605–609.

Brady, P. T., "A Model for Generating On–Off Speech Patterns in Two–Way Conversation," Bell Syst. Tech. Jour., vol. 48, No. 7, Sep. 1969, pp. 2445–2472.

Bursh, Jr., T. P., et al., "Digital Radio for Mobile Applications," AT&T Technical Journal, Jul./Aug. 1993, pp. 19–26.

Chang, J.J.C., et al., "Wireless Systems and Technologies: An Overview," AT&T Technical Journal, Jul./Aug. 1993, pp. 11–18.

Cox, D. C., "Universal Portable Radio Communications," Proc. IEEE, vol. 75, No. 4, Apr. 1987, pp. 436–477.

Cox, D. C., et al., "New Directions in Subband Coding," IEEE J. Select. Areas Commun. (Special Issue on Voice Coding for Communications), vol. SAC–6, No. 2, Feb. 1988, pp. 391–409.

(List continued on next page.)

*Primary Examiner*—Melvin Marcelo

[57] ABSTRACT

An apparatus and method for reducing the runlength of dropped packets in multiple access cellular communication systems. The invention is particularly well suited for use in time-division multiple access (TDMA) systems such as, for example, shared time-division duplexing (STDD) systems, and TDMA/TDD systems with speech activity detection (SAD). Frame time or frequency slots for communicating information are allocated to a first set of active users. A second set of active users which are not allocated a slot in a given frame are identified. At least one of the users in the second set which remains active in a subsequent frame is provided with a priority in obtaining an allocated slot in the subsequent frame. In one embodiment, the slots allocated to particular active users in the given frame are shifted by at least one slot position if the same users are allocated slots in the subsequent frame. The priority allocation and slot position shifting may be implemented by circular interleaving of the first set of users which have been allocated slots in the given frame with the second set of users which remain active but were not allocated slots in the given frame. The circular interleaving may be utilized with fast speech activity detection (FSAD) in order to further reduce dropped-packet runlengths.

26 Claims, 7 Drawing Sheets

OTHER PUBLICATIONS

Gerson, I. A., and Jasiuk, M. A., "Vector Sum Excited Linear Prediction (VSELP) Speech Coding at 8 Kbps," ICASSP'90, Albuquerque, Apr. 1990, pp. 461–464.

Gilhousen, K. S., et al., "On the Capacity of a Cellular CDMA System," IEEE Trans. on Veh. Tech., vol. 40, No. 2, May 1991, pp. 303–312.

Goodman, D. J., "Cellular Packet Communications," IEEE Trans, on Commun., vol. COM–38, No. 8, Aug. 1990, pp. 1272–1280.

Goodman, D. J., "Embedded DPCM for Variable Bit Rate Transmission," IEEE Trans. on Commun., vol. COM–28, No. 7, Jul. 1980, pp. 1040–1046.

Goodman, D. J., "Second Generation Wireless Information Networks," IEEE Transactions on Vehicular Technology, vol. 40, No. 2, May 1991, pp. 366–374.

Goodman, D. J., and Sundberg, C–E.W., "Transmission Errors and Forward Error Correction in Embedded Differential Pulse Code Modulation," Bell Syst. Techn. Jour., vol. 62, No. 9, Nov. 1983, pp. 2735–2764.

Goodman, D. J., et al., "Packet Reservation Multiple Access for Local Wireless Communications," IEEE Transactions on Communications, vol. 37, No. 8, Aug. 1989, pp. 885–889.

Goodman, D. J., et al., "Waveform Substitution Techniques for Recovering Missing Speech Segment in Packet Voice Communications," IEEE Trans. on ASSP, vol. ASSP–34, No. 6, Dec. 1986, pp. 1440–1448.

Grillo, D., MacNamee, G., "European Perspectives on Third Generation Personal Communication Systems," 40th IEEE Vehicular Tech. Conf., Orlando, May 1990, Conf. Rec. pp. 135–140.

Gruber, J., and Strawczynski, L., "Subjective Effects of Variable Delay and Speech Clipping in Dynamically Managed Voice Systems," IEEE Trans. on Commun., vol. COM–33, No. 8, Aug. 1985, pp. 801–808.

Hagenauer, J., et al., "The Performance of Rate–Compatible Punctured Convolutional Codes for Digital Mobile Radio," IEEE Trans. on Commun., vol. COM–38, No. 7, Jul. 1990, pp. 966–980.

Lam, S. S., "Packet Broadcast Networks—A Performance Analysis of the R–Aloha Protocol," IEEE Transactions on Computers, vol. C–29, No. 7, Jul. 1990, pp. 596–603.

Mallinder, B. J. T., "An Overview of the GSM System," Third Nordic Seminar on Digit Land Mobile Radio Communications, Copenhagen, Denmark, Sep. 1988, Conf. Rec. pp. 3.1.1–3.1.13.

Miki, T., et al., "Pseudo–Analog Speech Transmission in Mobile Radio Communication Systems," Reprinted from IEEE Transactions on Vehicular Technology, vol. 42, No. 1, Feb. 1993, pp. 69–77.

Nanda, S., and Yue, O–C., "Variable Partition Duplexing for Wireless Communications," Globecom'91, Phoenix, Arizona, Nov. 1991, Conf. Rec. pp. 32.6.1–32.6.7.

Ochsner, H., "Dect—Digital European Cordless Telecommunications," 39th IEEE Vehicular Tech. Conf., San Francisco, California, May 1989, Conf. Rec. pp. 718–721.

Ohno, K., and Adachi, F., "QDPSK Signal Transmission Performance with Postdetection Selection Diversity Reception in Land Mobile Radio," IEEE Trans. on Veh. Tech., vol. VT–40, No. 3, Nov. 1991, pp. 798–804.

Paratz, L. M., and Jones, E. V., "Speech Transmission Using an Adaptive Burst Mode Technique," IEEE Transactions on Communications, vol. COM–33, No. 6, Jun. 1985.

Seshadri, N., et al., "Advanced Techniques for Modulation, Error Correction, Channel Equalization, and Diversity," AT&T Technical Journal, Jul./Aug. 1993, pp. 48–63.

Steele, R., "The Cellular Environment of Lightweight Handheld Portables," IEEE Commun. Mag., vol. 28, No. 7, Jul. 1990, pp. 20–29.

Sundberg, C–E., W., and Seshadri, N., "Digital Cellular Systems for North America," IEEE Global Telecommunications Conference & Exhibition, Globecom'90, vol. 1, *Communications: Connecting the Future,* San Diego, CA, Dec. 2–5, 1990.

Swain, R. S., and Holmes, D. W. J., "The Digital Cordless Telecommunication Common Air Interface," British Telecom Tech. Jour., vol. 8, No. 1, Jan. 1990, pp. 12–18.

Wong, W. C., and Kuek, S. S., "Analytical Model for Variable Partition Duplexing," Electronic Letters, vol. 29, Aug. 1993, pp. 1513–1514.

Wong, W. C., et al., "Low Delay, High Quality Wireless Digital Speech Communications by Shared Time Division Duplexing," Globecom'93, Conf. Proc., Houston, TX, Nov. 1993, 5 pages.

Wong, W. C., et al., "Shared Time Division Duplexing: An Approach to Low–Delay High–Quality Wireless Digital Speech Communications," Reprinted from IEEE Transactions on Vehicluar Technology, vol. 43, No. 4, Nov. 1994, pp. 934–945.

Wong, W. C., et al., "STDD, An Approach to Low Delay, High Quality Wireless Speech Communications," IEEE 44th Vehicular Technology Conference, vol. 1, Conf. Proc., Stockholm, Sweden, Jun. 8–10, 1994, pp. 316–320.

MULTIPLE ACCESS CELLULAR COMMUNICATION WITH CIRCULAR INTERLEAVING AND REDUCED DROPPED-PACKET RUNLENGTHS

CROSS-REFERENCE TO RELATED APPLICATION

The present invention is a continuation-in-part of U.S. patent application Ser. No. 08/157,778 filed on Nov. 24, 1993, entitled "Method of Multiple Access" and assigned to the assignee of the present invention, now U.S. Pat. No. 5,420,851.

TECHNICAL FIELD

The present invention relates to a multiple access technique for a communication system. More particularly, the present invention relates to wireless communication systems utilizing multiple access techniques which involve, for example, allocating available frame time slots to uplink and downlink communication.

BACKGROUND OF THE INVENTION

The design of a communication network or system involves evaluating physical constraints, for example, the characteristics of a given communication channel, and system constraints, for example, the available bandwidth per channel, in order to achieve a network with desired performance characteristics, such as reliability of the information received. Cellular systems typically require low throughput delay of information and high reliability of information transfer and high capacity while restricting the bandwidth of each cellular frequency band.

Current wireless networks utilize multiple access techniques which multiplex users together in order to efficiently utilize network resources. In particular, these networks use either TDMA (time-division multiple access) with FDD (frequency-division duplexing) as in the pan-European GSM system (now also known as Global System for Mobile Communication) and the North American IS-54 system, or a variant, TDMA/TDD (time-division duplexing), as in the Digital European Cordless Telecommunications (DECT) system. See D. J. Goodman, "Second Generation Wireless Information Networks," IEEE Trans. Veh. Tech., VT-40, No. 2, pp. 366–374, May 1991.

For the multiple access systems described here, frames of time are the basic transmission unit. Each frame is divided into a plurality of slots of time. Some slots are used for control purposes and some slots are used for information transfer as described below. The information is transmitted during slots in the frame where slots are assigned to a specific user. Throughout this disclosure, it is understood that the term "information" refers to data representing speech, text, video or other digital information.

Other multiple access techniques, such as PRMA (Packet Reservation Multiple Access) and R-ALOHA (Reservation ALOHA), recognize the bursty nature of speech packets and increase system capacity by having a reservation mechanism for time slots. See D. J. Goodman, R. A. Valenzuela, K. T. Gayliard and B. Ramamurthi, "Packet Reservation Multiple Access for Local Wireless Communications," IEEE Trans. Comm., COM-37, No. 8, pp. 885–890, August 1989; and S. S. Lam, "Packet Broadcast Network—A Performance Analysis of the RALOHA Protocol," IEEE Trans. Comp., COMP-29, No. 7, pp. 596–603, July 1980. Although able to support a large number of users on a given channel bandwidth, these approaches have limited operating ranges, and in the case of PRMA, perform poorly under low delay constraints. In addition, PRMA techniques rely on actual speech transmission, that is, the user must be actively speaking, to allocate slots instead of relying on a separate control mechanism for allocating slots. This assignment method leads to collisions between packets of data and thus increases delay and reduces throughput. Other systems recognize that in a two-way conversation, it often occurs that only one user is active, thereby making it possible to obtain a high statistical multiplexing gain even with a low number of users when information from both conversation paths are multiplexed onto a common channel. See L. M. Paratz and E. V. Jones, "Speech Transmission Using an Adaptive Burst Mode Technique," IEEE Trans. Comm., COM-33, No. 6, pp. 588–591, June 1985; and S. Nanda and O. C. Yue, "Variable Partition Duplexing for Wireless Communications," GLOBECOM '91, pp. 32.6.1–32.6.7. However, such systems have typically been used to dynamically vary bandwidth assigned to two parties in a single conversation (duplex voice link). This reduces speech quality when both parties are talking simultaneously or when their speech overlaps. In addition, managing slot assignment is difficult since fractional slot assignment is necessary. Thus, there is a need for a multiple access system capable of providing high capacity, high quality and low delay communications, particularly for wireless personal communications systems competing with wired systems.

SUMMARY OF THE INVENTION

In accordance with one aspect of the present invention, a multiple access technique is described in which slots are dynamically allocated between uplink and downlink users. In a preferred embodiment, a method is presented for allocating slots in a communication system adapted to communicate information in an assigned slot on uplinks and downlinks between a user pair in a set of N user pairs. The method generates a set of frames, where each frame contains S information slots, $S=U_s+D_s+A$, having $U_s$ slots allocated for communicating information on the uplink, having $D_s$ slots allocated for communicating information on the downlink, and having A, $A \geq 0$, unused slots. $U_s$ and $D_s$ are varied dynamically in such a way as to improve overall system quality and capacity.

Another aspect of the invention involves reducing the runlengths of dropped packets in a TDMA/TDD/SAD or TDMA/STDD system. Although the average packet-dropping probability is generally low in, for example, an STDD system, packet-dropping events are often strongly correlated such that a particular user may experience a dropped-packet runlength corresponding to several frames or more. The packet dropping may result from, for example, use of a statistical multiplexing technique such as speech activity detection of the slow type (SAD), the fast type (FSAD), or of any other type, or from co-channel interference (CCI). The present invention utilizes, for example, circular interleaving to spread the dropped packets over many system users such that a given user will not experience an excessive runlength of dropped packets, and thus provides a more robust and higher quality communication system.

The above-discussed features, as well as additional features and advantages of the present invention, will become apparent by reference to the following detailed description and accompanying drawings.

DETAILED DESCRIPTION

Figure 1:
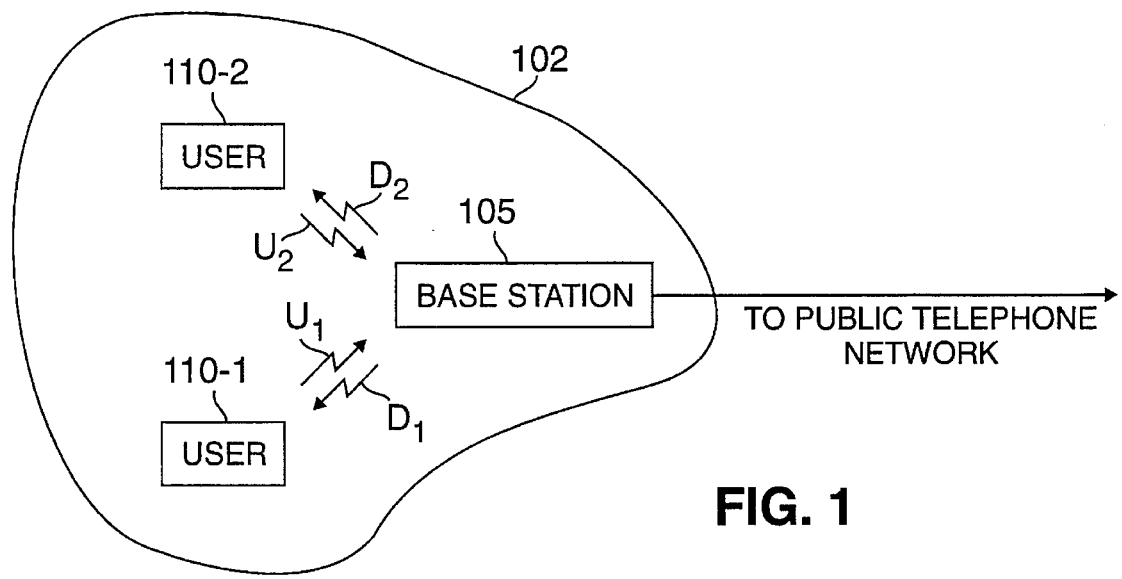
FIG. 1 illustrates the components of a cellular communications system.

FIG. 1 illustrates the components of a cellular or microcellular communications network. Cell 102 represents a portion of the geographic area served by the system. Within each cell is a base station 105 which is connected to the public telephone network. Base station 105 establishes a wireless link with users 110-i, i=1, ... N, wishing to transmit and receive information (that is, digital data representing text, speech, video, etc.) via the public telephone network. The wireless link between any given user pair, 110-i and base station 105, is comprised of an uplink $U_i$ for transmitting information from a user to base station 105 and then to the telephone network and of a downlink $D_i$ for transmitting information received by the base station from the telephone network to the user. Typically, concerns over throughput delay and efficient utilization of bandwidth resources in a network can be addressed by proper design or exploitation of modulation techniques, speech coding methods, channel coding and equalization techniques. See J. J. C. Chang, R. A. Miska and R. A. Shober, "Wireless Systems and Technologies: An Overview," AT&T Tech. J., Vol. 72, No. 4, pp. 11–18, Jul./Aug. 30 1993; T. P. Bursh, Jr. et al., "Digital Radio for Mobile Applications," AT&T Tech. J., Vol. 72, No. 4, pp. 19–26, July/August 1993; and N. Seshadri, C-E. W. Sundberg and V. Weerackody, "Advanced Techniques for Modulation, Error Correction, Channel Equalization, and Diversity," AT&T Tech. J., Vol. 72, No. 4, pp. 48–63, July/August 1993. For example, to minimize delay, space diversity in conjunction with a small degree of channel coding can be used. Low rate speech coders, such as ADPCM, EDPCM or LD-CELP, and modulation methods, such as pseudo-analog skewed DPSK, are also well suited to reducing delay. See T. Miki, C.-E. W. Sundberg and N. Seshadri, "Pseudo-Analog Speech Transmission in Mobile Radio Communications Systems," IEEE Trans. Veh. Tech., Vol. 42, No. 1, pp. 69–77, February 1993. Bandwidth resource concerns may be addressed through proper design of a multiple access technique. The goal of a multiple access technique is to regulate communications for the various user pairs within a cell given a limited number of available frequencies, limited bandwidth per channel, etc. More particularly, proper design of a multiple access system is important in configuring a low delay, high quality digital communication network. See generally, C-E. W. Sundberg and N. Seshadri, "Digital Cellular Systems for North America," GLOBECOM '90, Vol. 1, pp. 533–537, San Diego, Calif., December 1990.

Figure 2:
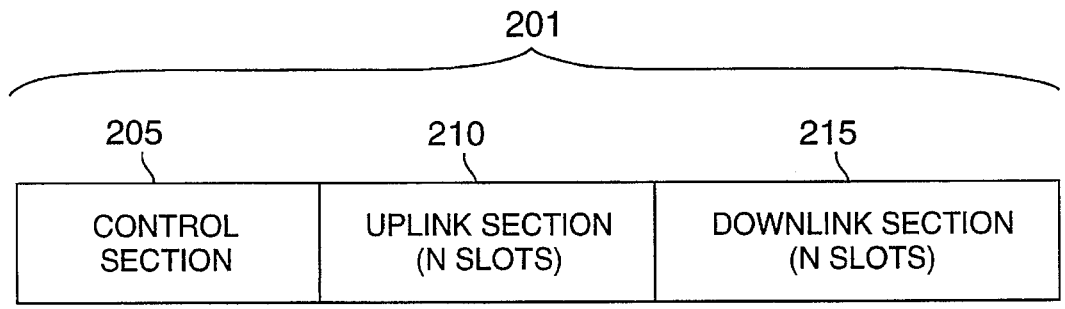
FIG. 2 is a diagram of a TDMA/TDD frame format known in the prior art.

FIG. 2 illustrates the principle of TDMA/TDD for purposes of comparison with other systems. Although standard TDMA/TDD has control information integrated into the headers of information sent in transmitted information slots, for illustrative purposes, frame 201 is divided into three sections all of which are transmitted in the same frequency band. Control section 205 contains information which relates to call management. Uplink section 210 and downlink section 215 are each divided into N slots. Thus, the uplink and downlink for each user pair can have a guaranteed slot for transmitting information. However, the system capacity is low since a slot is assigned to each user and no re-allocation of slots is performed if a user decides not to utilize (that is, transmit information during) an assigned slot.

Figure 3:
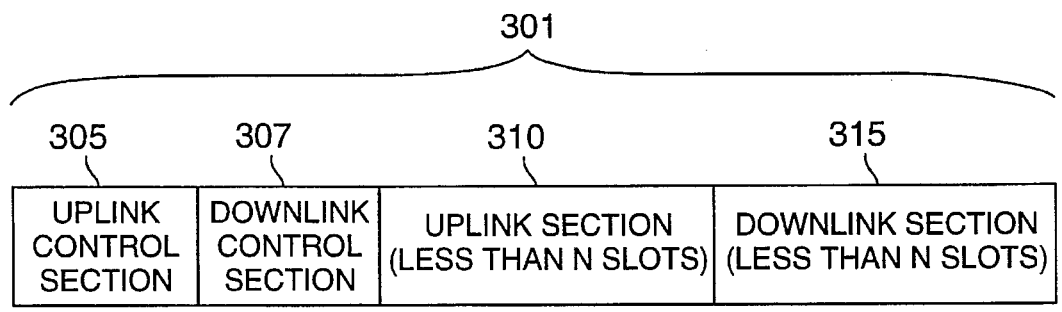
FIG. 3 is a diagram of a TDMA/TDD/SAD frame format known in the prior art.

Better utilization of network resources is obtained if the speech users are statistically multiplexed through the use of speech activity detection (SAD). FIG. 3 illustrates the format of TDMA/TDD/SAD frame 301 designed for use by up to N user pairs. TDMA/TDD/SAD frame 301 is divided into four sections. Uplink and downlink control sections 305 and 307 contain bits for handling call management functions. Uplink control section 305 contains bits for handling requests for uplink information slots. Downlink control section 307 contains bits which indicate which uplink and downlink information slots are assigned for the uplink and downlink users to send and receive information. Uplink section 310 and downlink section 315 are also divided into slots. There are an identical number of slots, fewer than N, in each of the uplink and downlink sections. The SAD techniques recognize that a significant portion of any information transfer, particularly a speech conversation, is comprised of silent portions, and no transmission of information need occur, that is, although N user pairs are active and wish to transmit information at some point, chances are that not all users are using their allocated slots 100% of the time. Thus, the number of slots required to satisfactorily accommodate up to N user pairs can be significantly reduced through ongoing reassignment of slots from inactive to active users. The result is a higher capacity (since there will be a reduced number of slots transmitting no information) and lower delay (since the frames can be made shorter given the reduced number of slots) system. However, the system typically requires a greater portion of the frame be devoted to overhead (that is, the control sections). Additionally, there will be insufficient resources to accommodate all users in times of peak demand, and thus some information will be lost because no slots will be available for data transmission and/or new user pairs will not be allowed access to the system.

Figure 4:
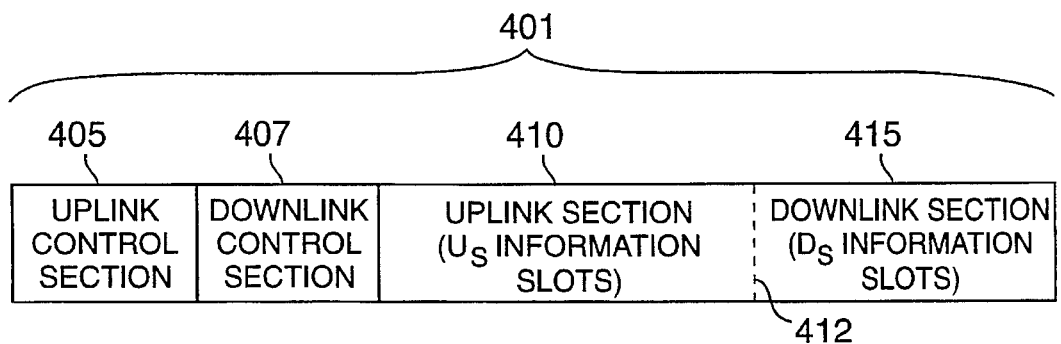
FIG. 4 is a diagram of a Shared Time-Division Duplexing (STDD) frame format.

FIG. 4 illustrates a format for frame 401 useful in practicing the invention. The invention, a multiple access system termed Shared Time-Division Duplexing (STDD), is designed to regulate traffic among up to N user pairs while allocating slots between uplinks and downlinks dynamically, for example, on a frame-by-frame basis. Frame 401 is divided into four sections. Call management functions are handled by separate uplink and downlink slots in uplink control section 405 and downlink control section 407, respectively, as described below. The remainder of frame 401 is divided into S slots, $S=U_s+D_s+A$, with $U_s$ slots allocated for uplink information transfer and $D_s$ slots allocated for downlink information transfer. A represents the number of slots, if any, not allocated. In frame 401 of FIG. 4, A=0. The number of slots allocated between uplink section 410 and downlink section 415 can vary with each frame as indicated by partition 412. However, the total number of speech slots S remains fixed for every frame. When there are a few users in the system and the total number of slots in any one direction is less than S/2, the information slots behave in a TDD manner with the S slots equally partitioned for the uplink and downlink access. When the number of users increases and the number of required speech slots in either direction exceeds S/2, partition 412 between the uplink and downlink slots varies according to demand.

The ability to share a common frequency band contributes to a higher statistical multiplexing gain even for a narrowband system with a limited number of users. The value of S typically is selected based on three factors: 1) the desired quality of the received information, that is, what level of packet loss is acceptable, 2) the number of user pairs to be accommodated, and 3) the accuracy of the speech activity detector, that is, how well silences and pauses in information transfers can be detected. For example, for a system with N=32 user pairs, 64 speech slots are required for standard TDMA/TDD while TDMA/TDD/SAD requires 46 speech slots at a high quality packet dropping rate of 0.01%. STDD typically requires 35 speech slots assuming a 2 millisecond frame size at the same dropping rate. The total statistical multiplexing gain is a function of the exact design of the control information.

Figure 5:
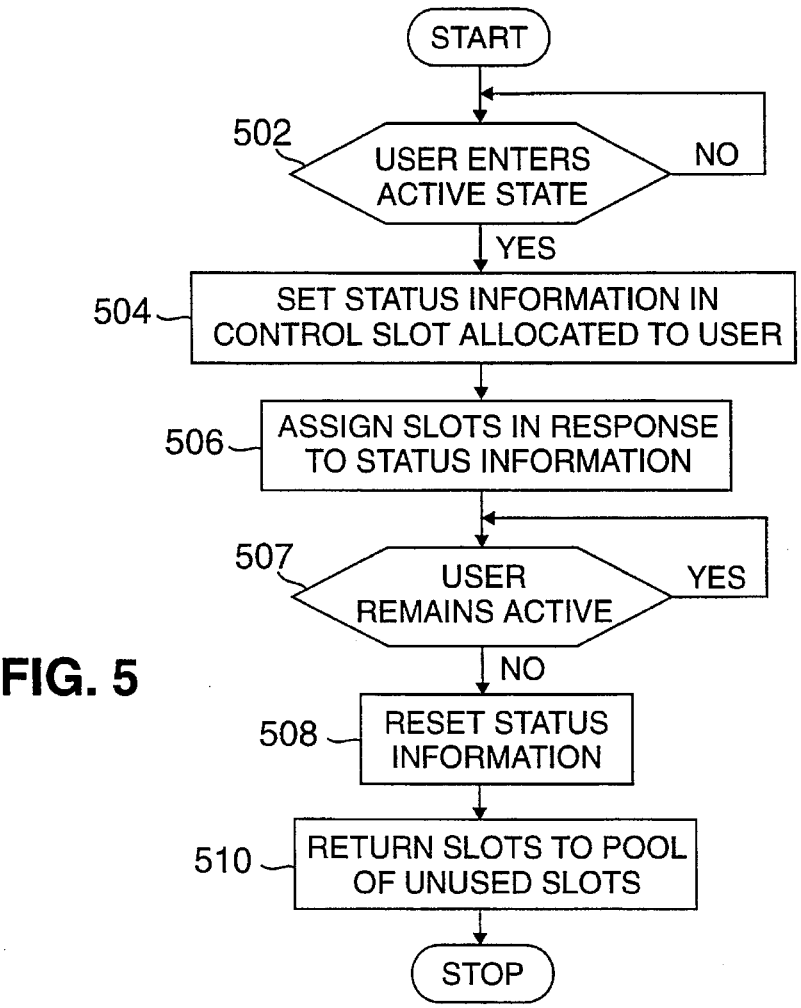
FIG. 5 is a flowchart of the steps in allocating slots in a frame in the present invention.

FIG. 5 is a flowchart of the steps in allocating slots. Note that all signalling functions pertaining to call management in a cellular or microcellular system, including handoffs and termination, but typically not call set up functions, are communicated via information in the control sections. In addition, the control information also indicate the state of a transmission, that is, whether a user is actively communicating information or is silent. When a user desires to send information and enters the active state in step 502, as for example when speaking, status information in the control slot assigned to the user requests a slot in the appropriate, that is, uplink or downlink, information section from the base station as shown in step 504. Typically, this may be implemented using a first-in, first-out (FIFO) service discipline in assigning information slots to users although other disciplines such as, for example, random service, may also be used. Similarly, the base station is aware of all slot requests emanating from the wired end of the network, and it assigns slots accordingly in step 506. The slot assignment information is carried in the downlink control information slots for both uplink and downlink users. Thus, it is advantageous to have transmission of uplink control information precede in time transmission of downlink control information so as to reduce delay. If a slot is not allocated to a user upon request, the information is dropped. When the information transfer is complete, the status information is reset in step 508 and the slot is returned to a pool of unused slots in step 510. The amount of control information is dictated by the needs of call management functions and the frequency of transmission activity.

The use of separate control and information slots helps alleviate the overhead efficiency problem common in PRMA-type networks and permits implementation of a simple access mechanism that advantageously works with speech activity detection while providing low access delay. Uplink control section 405 and downlink control section 407 may each contain N control slots. However, the overhead per frame can be reduced by establishing a duty cycle for the control information. For example, let the total number of control slots be 2C, where C is the number of uplink or downlink control slots, and let N (N being a multiple of C) be the maximum number of user pairs that can be supported. In general, C<N, and hence only C user pairs can communicate their control information to and from the base station in one frame period. Thus, it takes a total of K=N/C frame periods for all user pairs to be serviced this way, that is, K is the duty cycle to service all users. This access mechanism ensures that all users are guaranteed service within K frame periods. At the same time, since acknowledgements are communicated within the same frame period, a user with an acknowledged reservation can immediately send his speech packets within the same frame. Note that when a user makes a reservation for speech packets the user keeps the reservation for a minimum of K frame periods. For example, if the frame period is 2 ms, N=40, and C=5, then the duty cycle is 8 with a cycle period of 16 ms. Of course, the larger the duty cycle the smaller the amount of control overhead information. In STDD, a suitable cycle period is 16 ms where it is conveniently synchronized to the speech activity detection rate.

Even in the STDD system there may be situations where not all information slots are utilized, that is, A≠0. This spare capacity can be used for call setup when a new call arrives into the system. Assume that a new user monitors the control slots for a minimum of one cycle period to ascertain the status of the information slots, that is, to determine if all slots have been assigned. Thereafter, the system can use the spare information slots as a contention channel to inform the base station of this setup request by using, for example, an ALOHA-type of random access. If there are a number of available slots A, where A is less than S, the new call randomly selects one of these A slots to transmit its setup request packet. This request successfully reaches the base station if no other user transmits in the same slot. If the total number of user pairs currently serviced is less than N, the new call will be successfully serviced and an acknowledgment is sent on the next available downlink control slot. The location of this control slot also determines the new call's position in the control cycle stream. As noted above, when there are few users, STDD behaves as a TDMA/TDD/SAD system with slots equally allocated between the uplink and downlink. In this case, spare information slots used to set up a call should be treated as information slots so that slots remain equally allocated until such time that conditions demand that the partition between uplink and downlink slots be moved. The system above is described for up to N user pairs per carrier frequency. A number of carrier frequencies, each carrying up to N user pairs, can be used in high traffic areas.

Although the previous embodiments have focussed primarily on speech transmission, STDD can be used for mixed traffic conditions, for example, where some slots carry data and some carry speech. STDD can also be implemented in a variable rate per user mode, for example, a variable speech quality mode where a larger number of bits are allocated to customers requiring video or higher quality audio. The control channel contains the appropriate information. Thus, this method can be advantageously used where there is a broadband/narrowband information transfer between users in a user pair. In further embodiments, the dynamic allocation of slots between the uplink and downlink based on demand is implemented by means of frequency division where information is carried over dynamically allocated orthogonal frequency channels, or alternatively in a code division mode where traffic is carried by means of direct sequence spread spectrum with pseudo-orthogonal codes or in combinations of time division, frequency division and code division techniques. In another embodiment, the STDD format can be used in conjunction with a pseudo-analog skewed DPSK modulation technique to further reduce throughput delay in a communications system. Additional detail regarding pseudo-analog skewed DPSK modulation may be found in, for example, the above-cited article by T. Miki et al. entitled "Pseudo-Analog Speech Transmission in Mobile Radio Communication Systems," which is incorporated herein by reference.

The above detailed description has illustrated a method in which slots in a frame are dynamically allocated between uplink and downlink users. The method has not been limited to specific hardware or software. Instead, the method has been described in such a manner that those skilled in the art can readily adapt such hardware or software as may be available or preferable.

Although the exemplary STDD techniques described above provide considerable improvements in wireless communication systems, performance may be limited in certain embodiments by factors such as co-channel interference (CCI) and the runlengths of dropped packets.

The impact of CCI in an STDD system will now be described. Unlike a TDD technique in which fixed time slots are allocated to uplink and downlink transmission, an STDD technique allows time slots to be dynamically allocated to either uplink or downlink depending on demand. A user in a given cell may therefore be transmitting information in an uplink slot at the same time that a base station in a neighboring FR cell is transmitting in a downlink slot to another user. Signals transmitted from a base station are often at a significantly higher power level than signals transmitted from a mobile user, and a downlink signal transmitted in the neighboring FR cell may therefore interfere with reception of an uplink signal in the given cell. Because this type of CCI involves a downlink signal interfering with reception of an uplink signal, it is referred to herein as "mixed" CCI. In some cases this type of interference may produce a received signal-to-interference ratio (S/I) at the uplink base station that results in a dropped packet. Mixed CCI in an STDD system can thus significantly increase the packet-dropping rate and thereby reduce system capacity.

Mixed CCI generally does not arise in properly-synchronized TDMA/TDD and TDMA/TDD/SAD systems. However, TDMA/TDD and TDMA/TDD/SAD systems can exhibit "regular" CCI arising from, for example, interference between two different downlink signals or between two different uplink signals in neighboring FR cells. If mixed CCI is controlled or eliminated, the remaining regular CCI in an STDD system would generally be no greater than that in conventional TDMA/TDD and TDMA/TDD/SAD systems.

Figure 6:
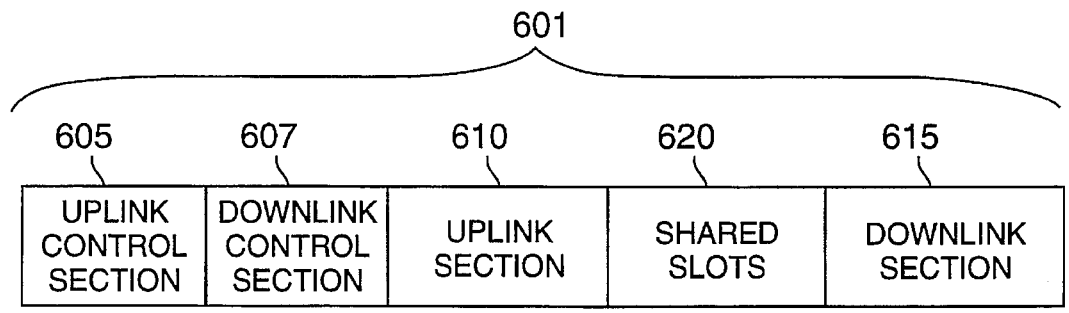
FIG. 6 is a diagram of a partially-shared time-division duplexing (PSTDD) frame format in accordance with the present invention.

The effects of mixed CCI can be reduced by dynamically allocating only a subset of the available slots in the STDD frame. FIG. 6 shows an alternative STDD frame 601 in accordance with the present invention. The frame 601 includes uplink and downlink control sections 605, 607 and uplink and downlink information sections 610, 615. The STDD frame 601 also includes a group of shared slots 620. The shared slots 620 represent a subset of the total information transmission slots available in the frame 601. The uplink and downlink sections 610, 615 contain slots which are permanently allocated to uplink and downlink information transmission, respectively. Although frame 601 is illustrated as an embodiment in which the number of unused slots A is equal to zero, other embodiments could include values of A greater than zero. Sections 610, 615 are thus similar to the sections 310, 315 in frame 301 of FIG. 3. The shared slots 620 are dynamically allocated between uplink and downlink transmission in accordance with demand, in a manner similar to the allocation of slots in sections 410 and 415 of FIG. 4. In the frame 601, therefore, only a subset of the total available information slots are dynamically allocated, while the remaining information slots are assigned to either uplink or downlink transmission. This alternative STDD technique is referred to herein as partially-shared time-division duplexing (PSTDD). Because only a subset of the available slots are dynamically allocated, the potential for mixed CCI is reduced. The fraction of total available information slots which are shared is designated by a partial sharing factor $\eta$ and different PSTDD techniques may therefore be referred to as PSTDD($\eta$) techniques. In a PSTDD($\eta$) system with a total of S information slots, there are $(S/2)(1-\eta)$ slots available only to the uplink users, $(S/2)(1-\eta)$ slots available only to the downlink users and the remaining $S\eta$ slots are shared among uplink and downlink users according to demand. In general, PSTDD systems with partial sharing factors $\eta$ of about 15% to 25% exhibit packet-dropping rates similar to those of corresponding STDD systems, but can provide a reduction in mixed CCI. Other partial sharing factors $\eta$ could also be used.

Other techniques which may be utilized to reduce mixed CCI include the use of directional antennas at cell base stations and proper slot-direction organization of a given frame so as to minimize the possibility of one directional antenna downlink interfering with another directional antenna uplink in a neighboring FR cell. These techniques are described in detail in U.S. patent application Ser. No. 08/364,579 filed Dec. 27, 1994 entitled "Multiple Access Cellular Communication With Dynamic Slot Allocation and Reduced Co-Channel Interference," which is assigned to the assignee of the present invention and incorporated by reference herein.

The remaining description will primarily address the effects of dropped-packet runlength in TDD and STDD systems. A packet refers to a quantity of information to be communicated during a given frame slot, and may represent information to be transmitted on a downlink from a base station to a user or on an uplink from a user to a base station. A TDMA system which requires a low throughput delay may drop a packet if a user is unable to obtain an available slot in the frame in which the packet was generated. Periods of high demand may, for example, cause several packets generated by the same user to be dropped in succession. It is therefore preferable to provide not only a low packet dropping rate for all users but also a minimal "run" of successive dropped packets experienced by any given user. The latter is referred to as the dropped packet runlength and is defined herein as the number of successive frames in which a particular user experiences a dropped-packet. The present invention provides techniques for reducing dropped packet runlength using circular interleaving and/or fast speech activity detection (FSAD), thereby improving system capacity.

Figure 7:
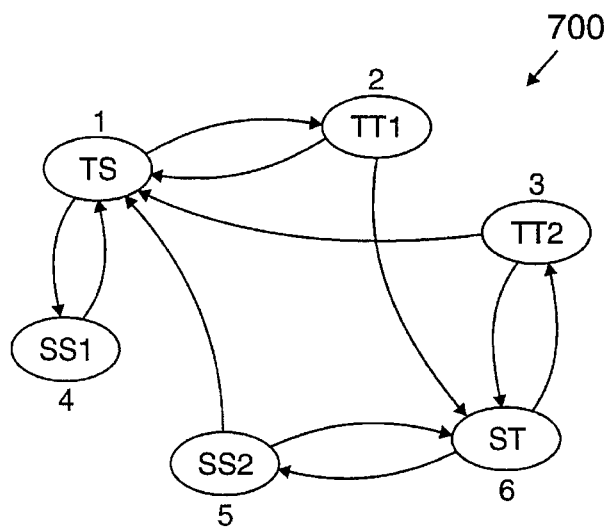
FIG. 7 shows a finite-state Markov model of slow speech activity detection (SAD) in accordance with the prior art.

FIG. 7 shows a six-state Markov model 700 corresponding to on-off conversation between a pair of users. The model is described in P. T. Brady, "A Model for generating on-off speech patterns in two-way conversations," Bell Syst. Tech. Journal, Vol. 48, pp. 2445–2472, September 1969, which is incorporated by reference herein. The six states 1 through 6 are designated in FIG. 7 as TS, TT1, TT2, ST, SS1 and SS2 depending upon whether the first and second users are talking (T) or silent (S). State SS therefore corresponds to a situation in which both users are silent while states TT1 and TT2 correspond to situations in which both users are talking. States TS, TT1, TT2 and ST are referred to generally herein as talk states because in those states at least one of the users is talking.

The time-averaged distribution of the number of required slots in a TDD or STDD system may be used by those skilled in the art to obtain expressions for the average probability of dropping a packet. Even in a system with a packet dropping rate on the order of 0.01%, the conditional probability that a packet is dropped in a particular frame given that one or more packets were dropped in the preceding frame may remain large, resulting in an unacceptably long dropped packet runlength.

The following description will assume conventional first-in first-out (FIFO) servicing of users that enter a talk state from a silent state. A queue formed by the users whose requests cannot be accommodated by available slots is referred to herein as a blocked queue. As will be described below, the blocked queue can also be viewed as a waiting portion of a larger queue, where the larger queue includes both blocked users and users with assigned slots. A user experiencing dropped packets waits until one or more preceding users in the blocked queue exit a talking state. The length of time which it takes a user in the blocked queue to be accommodated by the system is designated by a random variable L, and represents the cumulative duration of consecutive frames for which the user remains blocked, that is, the dropped-packet runlength. The value of L generally depends on the position of the user in the blocked queue as well as the manner in which the preceding users in the queue are accommodated. The probability distribution of L generally depends on the number of slots S, the number of user pairs N and the type of duplexing technique that is used, and can be estimated and/or computed in an known manner using techniques based on the Brady model.

Even if the average dropped-packet runlength is acceptable in certain TDMA/TDD/SAD and TDMA/STDD applications, the standard deviation of L often remains unacceptably high. For example, dropped packet runlengths of as much as 100 or 200 frames may be observed in a system with a 2 ms frame duration. A user who experiences a dropped packet could therefore be completely blocked for a considerably long period of time. The present invention alleviates this problem by ensuring that dropped packets are substantially distributed among all users over the frames in which drops occur. As a result, even during long periods of dropped packets the dropped-packet runlength for any particular user can still be of relatively short duration.

In a preferred embodiment, circular interleaving is used to periodically shift user slot assignments by one or more slots after each frame. For example, even assuming no users exit or enter a talk state in a given frame and therefore slot assignments would otherwise remain the same, each user could still be directed to transmit its packet one or more slots earlier in the following frame. A number of exceptions could be made to this alteration in slot assignment. For example, a user first blocked in the preceding frame may be permitted to transmit in the same slot in the following frame, since that user would not yet be experiencing a long dropped-packet runlength. Another exception could be made for a user that pays an additional service fee in order to continuously maintain possession of a particular slot previously allocated to that user. Payment of the additional fee can thus provide certain users with a significantly lower packet dropping rate and thereby higher quality communication.

Figure 8A:
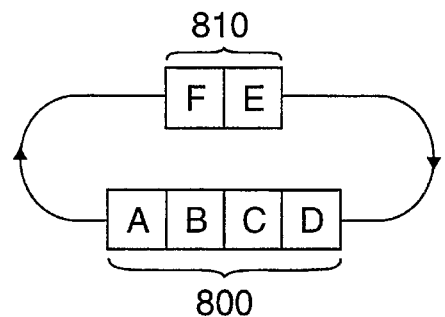
FIGS. 8A and 8B illustrate an exemplary circular interleaving technique using a single queue for both uplink and downlink users in accordance with the present invention.
Figure 8B:
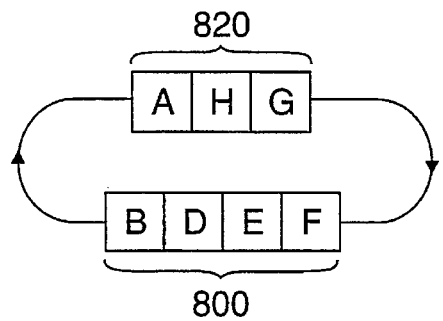

FIGS. 8A and 8B illustrate the operation of an exemplary circular interleaver in accordance with the present invention. In this embodiment, the single circular interleaver shown can be used for either uplink or downlink slots. The following will assume that the circular interleaver is used for uplink slots. FIG. 8A shows allocation of a group of four available uplink time slots 800 to a number of uplink users during a frame n−1. The uplink users A, B, C and D have been allocated slots. In this example, the uplink slot demand is greater than the number of available uplink slots so users E and F wait in a blocked queue 810. FIG. 8B shows the allocation of the four uplink time slots 800 during the next time frame n in which user C exits a talking state and users G and H enter a talking state. Users A, B, E, F, G and H are active in frame n and require uplink slots in which to communicate information, while user C is no longer active and does not require a slot. Again, only the four uplink slots 800 are available. Users G, H and A therefore enter a blocked queue 820. Users B and D are then allocated different time slots than those which were allocated to B and D in frame n−1. Users E and F exit the blocked queue 810 of FIG. 8A and are allocated slots in the group of available slots 800. It can be seen from FIGS. 8A and 8B that the users which were blocked in a given frame n−1, such as users E and F, are allocated slots in the next frame n. Users which have been allocated slots during frame n−1 and remain active in frame n are then assigned any remaining slots but are shifted at least one slot position to the left in frame n. As a result of the one-slot shift to the left, user A, although remaining active, is unable to obtain a slot in frame n, and will experience a dropped packet. Blocked queues 810 and 820 operate as first-in, first-out (FIFO) queues in this example, but other queuing techniques could also be used. A similar circular interleaver can be utilized for downlink slots.

The circular interleaver of FIGS. 8A and 8B can be implemented as a set of memory locations in which user identifiers are stored during each frame. The position of a particular user identifier in the memory can indicate the uplink or downlink slot assigned to that user in the current frame, or the position of that user in a blocked queue. The blocked queues 810, 820 and available slots 800 thus represent memory storage locations for particular user identifiers. Blocked queue 810 or 820 and available slots 800 could be a waiting portion and an available slot portion, respectively, of a single queue. The waiting portion and available slot portion may be implemented as memory locations storing user identifiers. The position of the users in the single queue are rotated, using appropriate control processing, in the manner previously described.

In a conventional slot assignment, the users A, B, D and E of FIGS. 8A and 8B could have been assigned the slots in the group of available slots 800 and user F would have experienced dropped packets for two consecutive frames. With the circular interleaving of the present invention, the dropped packets are spread across users such that users A, E and F each experience a dropped packet for only one frame. It will be apparent to those skilled in the art that this circular interleaving can be readily applied in any of a number of different TDMA communication systems, including both TDD/SAD and STDD systems. The circular interleaving of the present invention does not significantly increase throughput delay, nor does it require complex computational operations.

In a TDD/SAD system in which L is very large relative to the number $n_u$ of uplink packets generated during a given frame, circular interleaving provides a reduced maximum number of packets dropped per user which can be approximated as:

$$L(n_u-S/2)n_u.$$

For example, if $(n_u-S/2)=1$, the maximum number of packets dropped per user is reduced by a factor of $n_u$. Circular interleaving thus provides considerable improvement in terms of system robustness to dropped packets. An exemplary TDD/SAD system in accordance with the present invention utilizes two circular interleavers of the type shown in FIGS. 8A and 8B, one for uplink packets and one for downlink packets. As noted above, each circular interleaver may be implemented as a single queue which directs the interleaving of available uplink or downlink slots, respectively.

Figure 9A:
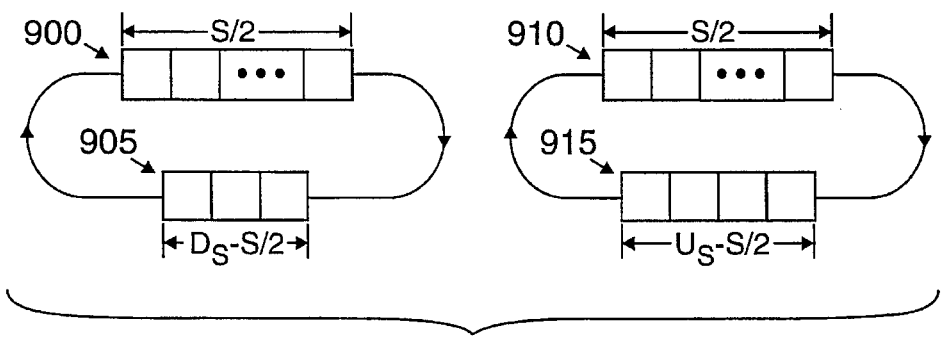
FIGS. 9A and 9B illustrate circular interleaving in an STDD system using separate queues for uplink and downlink users in accordance with the present invention.
Figure 9B:
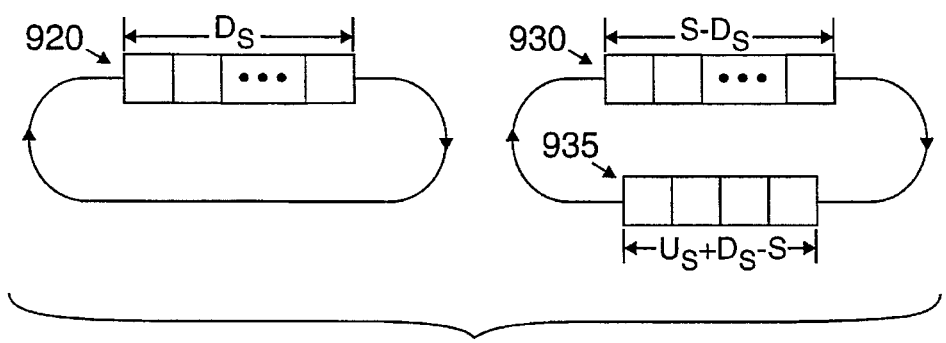

In an STDD system, separate interleavers are also preferably used for uplink and downlink packets. FIGS. 9A and 9B show an exemplary implementation of separate circular interleavers for uplink and downlink. FIG. 9A corresponds to a situation in which the number of required uplink slots $U_S$ and the number of required downlink slots $D_S$ are both greater than or equal to S/2, where S is the total number of available slots. In this situation, a downlink queue includes an available slot portion 900 of length S/2 and a waiting portion 905 of length $D_S-S/2$. An uplink queue includes an available slot portion 910 of length S/2 and a waiting portion 915 of length $U_S-S/2$. The uplink and downlink queues provide circular interleaving of uplink and downlink users, respectively, in a manner similar to that previously described in conjunction with FIGS. 8A and 8B. Again, the queues may be implemented as a set of memory locations along with appropriate control processing. FIG. 9A is also illustrative of the operation for an exemplary TDD/SAD system with uplink an downlink circular interleaving.

FIG. 9B shows separate uplink and downlink circular interleavers in a situation in which Ds is less than or equal to S/2, $U_S$ is greater than S/2, and $D_S+U_S$ is greater than S. A downlink queue includes an available slot portion 920 of length $D_S$. Because all downlink users are assigned slots, the downlink queue does not include a waiting portion. An uplink queue includes an available slot portion 930 of length $S-D_S$ and a waiting portion 935 of length $U_S+D_S-S$. Again, the uplink and downlink queues provide circular interleaving by, for example, storing and shifting user identifiers in the manner previously described. FIGS. 9A and 9B may be suitably modified to cover other situations. For example, if $U_S$ is less than or equal to S/2, $D_S$ is greater than S/2, and $U_S+D_S$ is greater than S, the resulting uplink and downlink queues would then be similar to the downlink and uplink queues, respectively, of FIG. 9B. In addition, modifications to the queue lengths shown in FIGS. 9A and 9B resulting from the use of PSTDD will be readily apparent to those skilled in the art.

In an STDD system, if $n_u$ denotes the number of uplink packets generated during a given frame, and $n_d$ denotes the number of downlink packets generated during the given frame, the average number of packets dropped per user in a case in which a total of L packets are dropped is approximately:

$$i\ L(n_u+n_d-S)/(n_u+n_d).$$

An STDD system with circular interleaving in accordance with the present invention can thus provide improved performance relative to both an STDD system with no circular interleaving and a TDD/SAD system with circular interleaving.

The circular interleaving of allocated time slots could be used in conjunction with co-channel interference reduction techniques such as those described in the above-cited U.S. patent application Ser. No. 08/364,579. It should also be noted that the use of circular interleaving to reduce maximum runlengths permits waveform substitution techniques to be used to improve speech recovery. Additional detail regarding waveform substitution may be found in, for example, D. J. Goodman, G. B. Lockhart, O. J. Wasem and W. C. Wong, "Waveform substitution techniques for recovering missing speech segment in packet voice communications," IEEE Trans. on Communications, Vol. 33, pp. 801–808, August 1985, which is incorporated by reference herein. Waveform substitution is generally not suitable for use in TDMA systems which do not utilize circular interleaving and therefore exhibit excessive dropped-packet runlengths. Other techniques which may be used to improve speech recovery include, for example, interpolation and prediction.

Another technique which may be used to further reduce maximum dropped packet runlengths in accordance with the present invention involves fast speech activity detection (FSAD). FSAD exploits the fact that there are generally gaps of silence during a given talk state. The present invention can utilize FSAD to further increase TDD or STDD system capacity beyond what is achievable with conventional slow speech activity detection (SAD) techniques. The six-state Markov model 700 shown in FIG. 7 can be modified to account for FSAD by partitioning each talk state of the model 700 into substates. A user can be characterized as moving through these substates while the user is within the corresponding talk state. FSAD involves partitioning at least two distinct groups of states in the model 700 into substates. The first group includes states TS and ST and the second group includes states TT1 and TT2. Additional detail regarding FSAD may be found in, for example, D. J. Goodman and S. X. Wei, "Efficiency of Packet Reservation Multiple Access," IEEE Trans. Veh. Tech., Vol. 40, No. 1, pp. 170–176, February 1991, which is incorporated by reference herein.

Figure 10A:
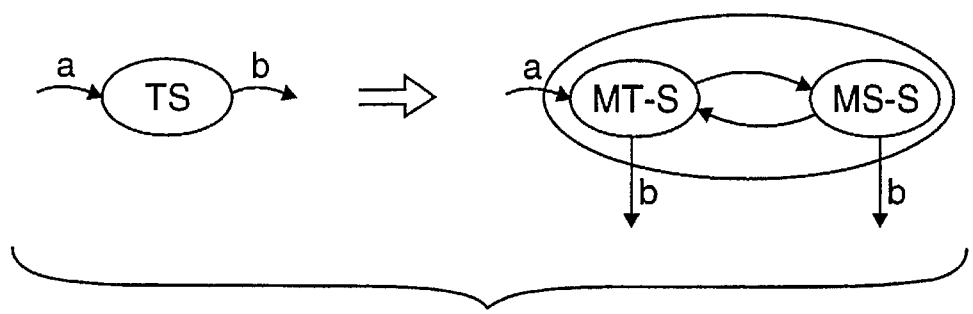
FIGS. 10A and 10B show the modifications to the model of FIG. 7 required to provide fast speech activity detection (FSAD).
Figure 10B:
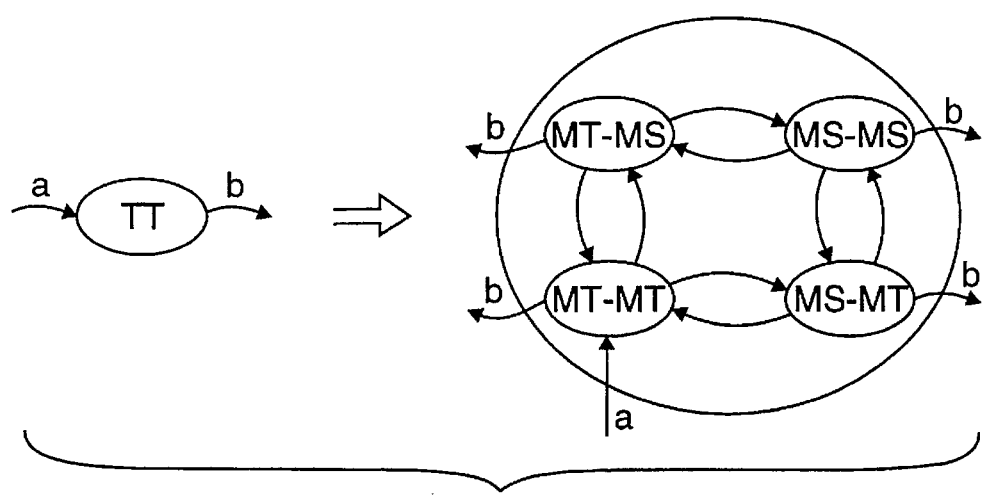

FIGS. 10A and 10B illustrate an exemplary partitioning of the first and second groups, respectively, into substates. The substates are identified as either mini-talk (MT) or mini-silence (MS) states within the particular talk state of a user. FIG. 10A indicates that a state TS can be divided into two states MT-S and MS-S, in which the first user is in either an MT or MS state while the other user is silent. The state TS can be exited from either the MT-S state or the MS-S state and when the user is in the TS state the conversation can be characterized as being in either state MT-S or MS-S. A similar division into substates is used for the state ST. FIG. 10B indicates that a state TT in which both users are talking at the same time can be divided into four different substates designated MT-MS, MT-MT, MS-MS and MS-MT. This division is used for both states TT1 and TT2 of the FIG. 7 model. The division into substates in this example thus yields a total of 14 substates which may be written as follows: $\{1_A, 1_B\}$, $\{2_A, 2_B, 2_C, 2_D\}$, $\{3_A, 3_B, 3_C, 3_D\}$, $\{4\}$, $\{5\}$, $\{6_A, 6_B\}$. Numbers 1 to 6 correspond to the six states shown in FIG. 7. The subscript A designates the MT-S substate in states TS and ST of FIG. 7 and the MT-MT substate in states TT1 and TT2. The subscripts B, C and D designate the substates MS-MT, MT-MS and MS-MS, respectively, in states TT1 and TT2. The two silence states SS1 and SS2 are not divided into substates. A stationary probability distribution can be developed for this FSAD model by estimating a probability for each of the 14 substates. The calculations involved in compiling such a distribution are well within the ordinary skill in the art and are therefore not further described herein.

Figure 11:
FIG. 11 shows a simplified model suitable for use in the analysis of dropped-packet runlengths in an STDD system with FSAD.

FIG. 11 shows an exemplary model which may be used to estimate the dropped-packet runlength reduction produced using FSAD in an STDD system. The model of FIG. 11 indicates that a user in any given mini-talk state MT will eventually exit that state with probability $P_{TS}$ to enter either a silence state S or mini-silence state MS. This simplified model is illustrative of the runlengths which will be observed in an actual FSAD system because the jumps from a mini-talk state to a mini-silence state generally occur much more frequently than jumps from one main state to another. A conditional dropped-packet runlength distribution can also be obtained in this case. The value chosen for $P_{TS}$ may be the minimum among all one-step transition probabilities from a mini-talk state to any silence or mini-silence state, as determined in accordance with the stationary probability distribution noted above. This results in an upper bound to the actual cumulative distribution for the runlength of dropped packets. Using this model the expected value of L for a user entering the blocked queue in the first position, for a system with 40 information slots and a frame duration of 2 ms, is on the order of 12 ms for a TDD system and about 7 ms for an STDD system. The details of the computation will be apparent to those skilled in the art and are therefore omitted. In this example, STDD is thus superior to TDD in robustness to dropped-packet runlength for a given dropping rate when using FSAD.

An important feature of FSAD in accordance with the present invention is that FSAD randomly spreads dropped packets among users. As noted above, each user generally passes between an MT and an MS state very frequently within a given talk state. FSAD therefore effectively performs additional randomizing of user slot allocation which further decreases the runlength of dropped packets. It should be noted that even in an FSAD system there still exists the possibility that a runlength experienced by a particular user may become arbitrarily long. It is therefore preferable to use the circular interleaving of the present invention in conjunction with FSAD. The decision to use circular interleaving with or without FSAD may involve a tradeoff between minimized runlength and the increased system processing complexity which generally accompanies the use of FSAD. Of course, other types of speech activity detection could also be used, including techniques operating at any suitable detection rate.

Figure 12:
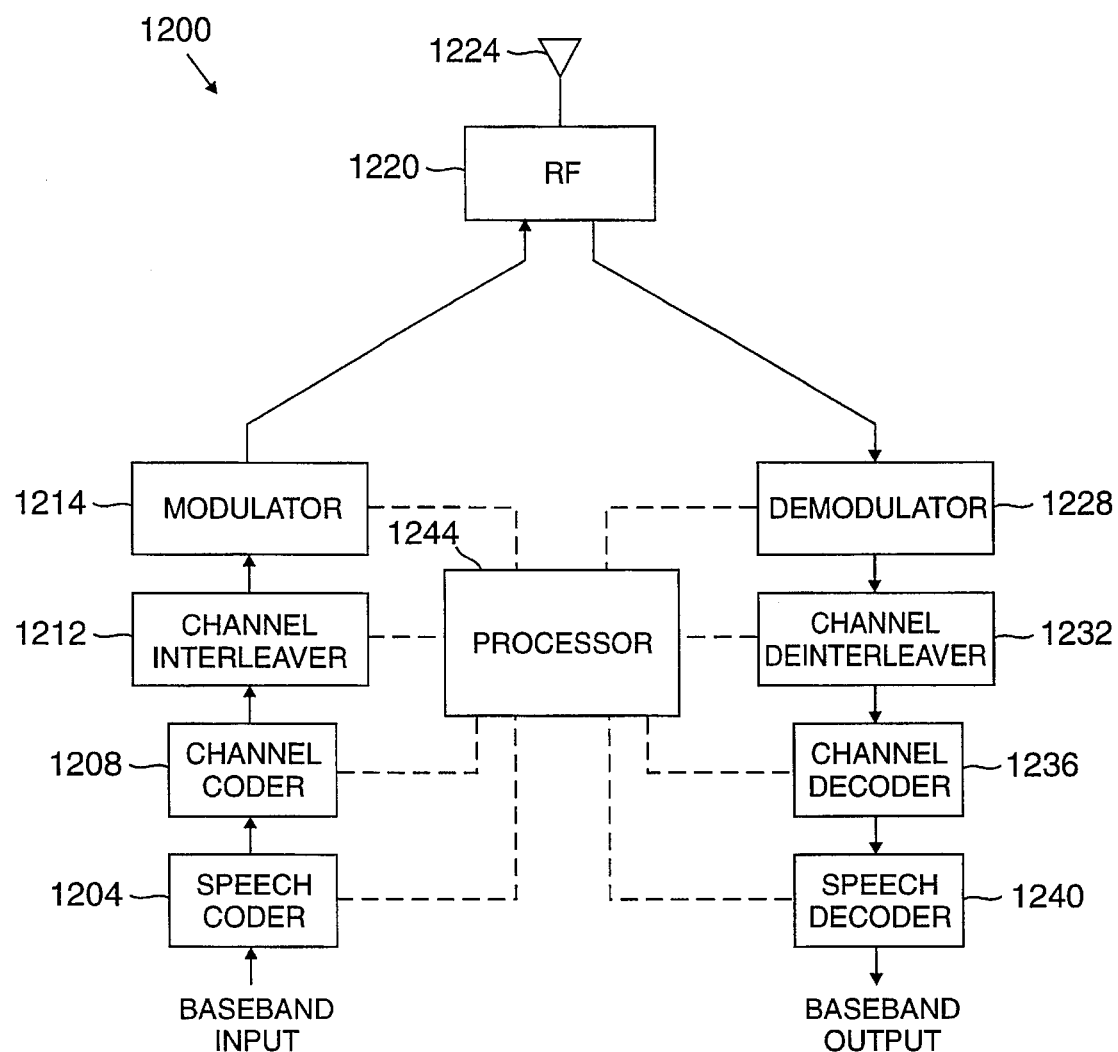
FIG. 12 is a block diagram of an exemplary communication system with circular interleaving in accordance with the present invention.

FIG. 12 shows an exemplary communication system 1200 in accordance with the present invention. The system 1200 includes a speech coder 1204 which processes a baseband input from, for example, a public telephone line connected to a base station in a cellular system. The coded speech is applied to a channel coder 1208. The output of the channel coder represents information packets to be transmitted to users from the base station. A channel interleaver 1212 randomly interleaves packets in a manner well-known in the art in order to mitigate the effects of, for example, channel fading. It should be noted that channel interleaving, unlike the above-described circular interleaving of the present invention, generally does not reduce dropped-packet runlengths. As will be described below, the circular interleaving is performed in this embodiment using a processor 1244 which includes memory storage locations and implements queues such as those described in conjunction with FIGS. 8A, 8B, 9A and 9B. The circular interleaving may utilize control information to identify users, and is suitable for use in systems with control information duty cycles $K \geq 1$. Those skilled in the art can readily determine suitable adjustments in the arrangement and/or processing of the control information for systems in which $K > 1$.

The packets are modulated onto one or more carrier signals in modulator 1214 and supplied to an RF processor 1220 and an antenna 1224. The antenna 1224 may be an omnidirectional antenna suitable for communicating with a number of different mobile users in a particular cell of a cellular system. The system 1200 also receives signals from the users via antenna 1224 and RF processor 1220. The received signals are demodulated in demodulator 1228. The demodulated packets are then processed in a channel deinterleaver 1232 such that previously-applied channel interleaving is removed and the positioning of a packet in a given time frame is compatible with the decoding applied by a channel decoder 1236. A speech decoder 1240 converts the received information into a baseband output which may be supplied to a telephone line in the public telephone network. A processor 1244 directs the operation of, for example, elements 1204–1214 and 1228–1240 or subsets thereof, and in other embodiments one or more of these elements may be partially or entirely incorporated within the processor 1244. The processor 1244 may be implemented as a computer, microprocessor, application-specific integrated circuit (ASIC) or any other suitable arrangement of hardware, software or firmware. In one embodiment, the processor 1244 includes a memory with a number of storage locations suitable for storing, for example, user identifiers. The processor 1244 then provides circular interleaving in accordance with the present invention by using the memory to implement one or more queues in the manner described above in conjunction with FIGS. 8A, 8B, 9A and 9B. The processor 1244 controls the shifting or other movement of user identifiers within the queues such that users blocked in one frame are provided a priority in slot allocation in a subsequent frame. In other embodiments, the processor could interact with an external memory unit to control circular interleaving. The processor 1244 may also be utilized to implement the above-described FSAD technique by detecting MS and MT substates in the voice signals and then organizing and allocating packets accordingly. The details regarding implementation of FSAD in a cellular system are generally well-known in the art and will therefore not be further described herein.

Although the system 1200 is illustrated as processing baseband voice signals and utilizing channel coding and interleaving, it should be emphasized that this is not by way of limitation. For example, the present invention is suitable for use in systems which communicate any type of data and in systems which do not utilize channel coding and/or interleaving. Channel coding/decoding and interleaving/deinterleaving generally randomize a communication channel and thereby mitigate the effects of, for example, channel fading. However, this usually comes at the expense of increased total delay. A preferred embodiment of the invention therefore eliminates channel coding and channel interleaving and utilizes any of a number of well-known space diversity techniques to control channel fading.

Figure 13:
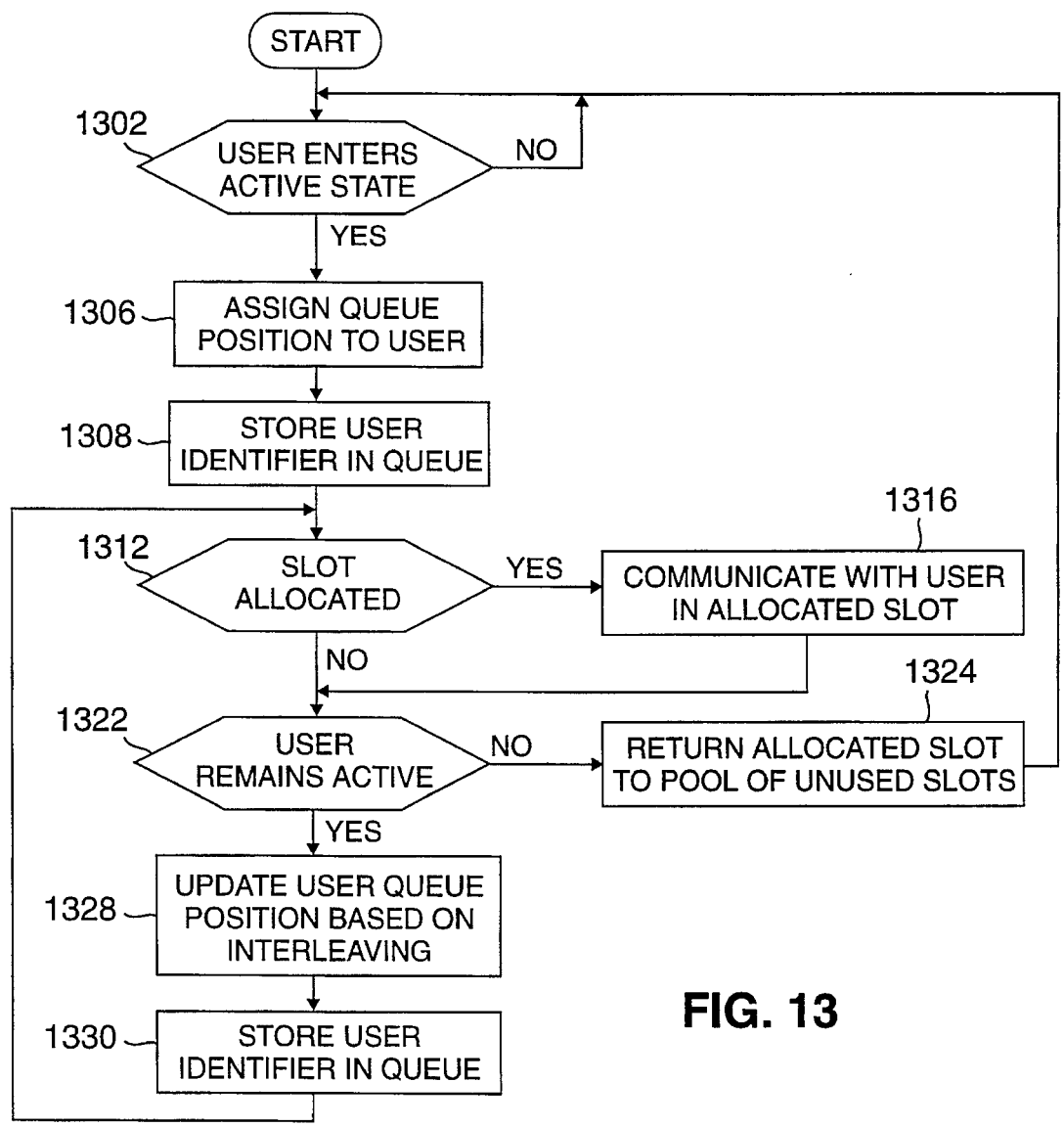
FIG. 13 is a flow chart of an exemplary set of processing steps suitable for providing circular interleaving in accordance with the present invention.

FIG. 13 is a flow chart illustrating circular interleaving in accordance with the present invention. Decision step 1302 indicates that when a given user enters an active state by, for example, initiating a conversation, a queue position is assigned to that user in step 1306. A user identifier corresponding to that user is then stored in a queue in step 1308. In this embodiment, it is assumed the circular interleaver includes both an uplink queue and a downlink queue, each with an allocated slot portion and a waiting portion, as described in conjunction with FIGS. 9A and 9B above. A reference to a queue in conjunction with FIG. 13 should therefore be understood to refer to either the uplink or downlink queue, depending on whether the given user is communicating on an uplink or a downlink.

In decision step 1312, an attempt is made to allocate a time slot in the current frame to the user. If the slot is allocated in step 1312, communication with the user can take place in the allocated slot as shown in step 1316. Decision step 1322 indicates that if the same user does not remain active during the next frame, any previously-allocated slot is returned to a pool of unused slots as shown in step 1324. The process then returns to step 1302 and remains there until the inactive user reenters an active state. If the user remains active in step 1322, the queue position assigned to the user is updated based on the above-described circular interleaving as shown in step 1328. For example, assume user A in FIG. 8A was allocated the first frame time slot, corresponding to a first queue position in frame n−1. During a subsequent frame n, user A is assigned a different queue position, such as the queue position corresponding to the end of blocked queue 820 in FIG. 8B. Step 1330 indicates that the updated queue position for the user is stored in the form of a user identifier. The process then returns to step 1312 to attempt to allocate a slot in the next frame to that user. The steps shown are repeated for multiple users in each frame, and from frame to frame, in accordance with the circular interleaving described above. The queue may be maintained in, for example, processor 1244 of FIG. 12, and may be implemented in random-access memory, cache memory, or other types of electronic or magnetic memory. The steps shown in FIG. 13 provide the circular interleaving by, for example, keeping track of which slots have been previously allocated to users and shifting or otherwise altering the slots allocated to any of these users which remain active in the next frame.

As described above in conjunction with FIGS. 8A, 8B, 9A and 9B, a user which is assigned a slot in a first slot position in the current frame can be shifted out of that position and placed at the end of a blocked queue, or in a waiting portion of a single uplink or downlink queue, during a subsequent frame. This can occur if, for example, there are other user identifiers stored in the blocked queue or waiting portion of a queue, all available slots in the subsequent frame are allocated to other users, and the user previously assigned the first slot position remains active. Of course, there are many variations on this technique which could be used. In general, the interleaving techniques may be described as providing a slot allocation priority to a previously-blocked user. Circular interleaving is only one possible technique for providing the priority. Other techniques include applying any of a number of alternative permutations to the slot allocation order such that the risk of dropped packets are spread over a larger number of users. Additional alternatives include applying circular interleaving to only a subset of the active users in a given frame, or allowing one or more users to maintain possession of a particular slot over a number of frames. It should be noted that it is not necessary to store an identifier corresponding to a previously-blocked user. For example, by altering slot assignments before or after allocation such that a user assigned the first slot position is not automatically assigned that same slot in a subsequent frame, but instead must compete with all other users for another slot in the frame, a priority is in effect provided to a previously-blocked user.

The embodiments of the invention described above may also be utilized in a frequency-division multiplexed (FDM) system. In such a system, a time slot allocated to a user represents one of a number of available carrier frequencies. The term "frame slot" as used herein is therefore intended to include, for example, both time slots and frequency slots. The circular interleaving or, more generally, slot allocation permutation of the present invention is then applied to the various FDM carrier frequencies, in a manner similar to that described above. A user which is blocked in one frame, and therefore is not allocated a carrier frequency, receives a priority in allocation in the subsequent frame. The present invention may also be implemented in a code division system. Those skilled in the art can readily adapt the teachings herein to implement a wide variety of different time division, frequency division and code division systems.

Although the above description illustrates the utility of the present invention primarily in terms of a wireless communication system incorporating an STDD multiple access technique, it should be understood that the apparatus and methods of the present invention are generally suitable for use with other TDMA communication techniques, including TDD/SAD. Many variations may be made in the embodiments shown, including the placement and implementation of the circular interleaver relative to other system elements, the type of interleaver used and the manner in which the interleaving alters the slot allocation to provide a priority to a previously-blocked user. These and other alternatives and variations in the arrangements shown will be readily apparent to those skilled in the art.

We claim:

1. In a communication system in which active users communicate information in allocated slots of a frame, a method of allocating uplink and downlink slots to ensure that dropped packets are substantially distributed among all users over the frame in which drops occur, the method comprising the steps of:

allocating slots in a given frame to a first set of the active users;

identifying a second set of the active users which are not allocated a slot in the given frame; and providing at least one of the active users in the second set which remains active in a subsequent frame with a priority in obtaining an allocated slot in the subsequent frame.

2. The method of claim 1 further including the steps of:

identifying a slot position of the slot allocated in the given frame to a particular active user in the first set;

determining if the particular user remains active in the subsequent frame; and allocating a slot having a different slot position to the particular active user in the subsequent frame.

3. The method of claim 1, wherein the step of providing the priority further includes allocating slots in the subsequent frame in accordance with a circular interleaving of those users in the first and second sets which remain active in the subsequent frame, even assuming no users exit or enter a talk state in the subsequent frame.

4. The method of claim 1 wherein the step of allocating slots in a given frame to a first set of active users further includes dynamically allocating at least a portion of the slots to uplink and downlink communication in accordance with demand from the users.

5. The method of claim 1 wherein the step of identifying the second set of the active users which are not allocated a slot in the given frame further includes the steps of:

determining a user identifier associated with each of the active users in the second set; and storing the user identifiers.

6. The method of claim 5 wherein the step of storing the user identifiers further includes storing the user identifiers in a first-in first-out queue in an order in which the second set of active users requested slots in the given frame.

7. The method of claim 1 wherein the information is voice information and the method further includes the step of organizing the voice information into slots using a speech activity detection technique.

8. The method of claim 7 wherein the speech activity detection technique identifies mini-talk and mini-silence states in the voice information.

9. The method of claim 1 wherein the information is voice information and the method further includes the step of applying a waveform substitution technique to reconstruct the information communicated by at least one of the active users.

10. In a communication system in which active users communicate information in allocated slots of a frame, an apparatus for allocating uplink and downlink slots comprising:

means for allocating slots in a given frame to a first set of the active users;

means for identifying a second set of the active users which are not allocated a slot in the given frame; and means for providing at least one of the active users in the second set which remains active in a subsequent frame with a priority in obtaining an allocated slot in the subsequent frame.

11. The apparatus of claim 10 further including:

means for identifying a slot position of the slot allocated in the given frame to a particular active user in the first set; and means for determining if the particular user remains active in the subsequent frame, such that a different slot position can be allocated to the particular active user in the subsequent frame.

12. The apparatus of claim 10 wherein the means for providing a priority to at least one of the second set of users which remains active in a subsequent frame includes a circular interleaver operative to alter slot allocations in the subsequent frame such that at least one user in the second set is allocated a slot in the subsequent frame before at least one of the users in the first set.

13. The apparatus of claim 12 wherein the circular interleaver alters slot allocations in the subsequent frame such that a slot position allocated in the subsequent frame to an active user in the first set is shifted by at least one slot position relative to the previously-allocated slot position in the given frame.

14. The apparatus of claim 10 wherein the communication system is a shared time-division duplexed system and the means for allocating slots in a given frame to the first set of active users further includes a processor operative to dynamically allocate at least a portion of the slots to uplink and downlink communication in accordance with user demand.

15. The apparatus of claim 10 wherein the information is voice information and the apparatus further includes a speech activity detector.

16. The apparatus of claim 15 wherein the speech activity detector is operative to organize the voice information into slots by identifying mini-talk and mini-silence states in the information.

17. The apparatus of claim 10 wherein the means for identifying a second set of the active users which are not allocated a slot in the given frame further includes:

a processor adapted to determine a user identifier associated with each of the users in the second set of users; and a memory in which the user identifiers are stored.

18. The apparatus of claim 17 wherein the memory in which the user identifiers are stored implements a first-in first-out queue to store the user identifiers in an order in which the second set of active users requested slots in the frame.

19. A communication system comprising:

a processor operative to allocate uplink and downlink slots in a frame to active users which require the slots to communicate information in the system; and means for altering slot positions of the slots allocated to the active users if those users remain active in a subsequent frame.

20. The system of claim 19 wherein the means for altering slot positions further includes:

a memory for storing user identifiers of active users which are not allocated a slot in the given frame; and circular interleaving means coupled to the memory and operative to implement in the subsequent frame a circular interleaving of active users having identifiers stored in the memory and active users previously allocated slots in the given frame.

21. The system of claim 20 wherein the memory implements a first-in first-out queue.

22. The system of claim 20 wherein the interleaving means is operative to shift a slot position of an active user assigned a slot in the given frame by at least one slot position in the subsequent frame, provided that user remains active in the subsequent frame.

23. The system of claim 20 wherein the interleaving means is operative to identify a user identifier of an active user allocated a slot in a given frame, and to store that user identifier in the memory, such that in the subsequent frame an additional slot can be made available for another active user having an identifier stored in the memory.

24. The system of claim 20 wherein the interleaving means alters slot positions allocated to active users such that a first user assigned a slot in a given frame is not assigned a slot in a subsequent frame if a second user, which was not assigned a slot in a previous frame, remains active in the subsequent frame, and all other available slots are allocated to other active users.

25. In a communication system in which active users communicate information in allocated slots of a frame, a method of allocating slots comprising the steps of:

allocating slots in a given frame to a first set of the active users;

identifying a second set of the active users which are not allocated a slot in the given frame; and providing at least one of the active users in the second set which remains active in a subsequent frame with a priority in obtaining an allocated slot in the subsequent frame;

wherein the step of allocating slots in a given frame to a first set of active users further includes:

assigning a first portion of the slots in the given frame to uplink communication;

assigning a second portion of the slots in the given frame to downlink communication; and dynamically allocating a third portion of the slots in the given frame to either uplink or downlink communication in accordance with demand from the users.

26. In a communication system in which active users communicate information in allocated slots of a frame, an apparatus for allocating slots comprising:

means for allocating slots in a given frame to a first set of the active users;

means for identifying a second set of the active users which are not allocated a slot in the given frame; and means for providing at least one of the active users in the second set which remains active in a subsequent frame with a priority in obtaining an allocated slot in the subsequent frame, wherein the communication system is a partially-shared time-division duplexed system and the means for allocating slots further includes a processor operative to assign a first portion of the slots in a given frame to uplink communication, to assign a second portion of the slots to downlink communication, and to dynamically allocate a third portion of the slots to either uplink or downlink communication in accordance with user demand.

* * * * *